(12) United States Patent
Kager (10) Patent No.: US 10,160,137 B2
(45) Date of Patent: Dec. 25, 2018

(54) DEVICE AND METHOD FOR PRODUCING A SLAB FROM ARTIFICIAL STONE MATERIAL

(71) Applicant: Wolfgang Johann Horvath, Wiener Neustadt (AT)

(72) Inventor: Franz Kager, Schwechat (AT)

(73) Assignee: Wolfgang Johann Horvath (AT)

( * ) Notice: Subject to any disclaimer, the term of this patent is extended or adjusted under 35 U.S.C. 154(b) by 535 days.

(21) Appl. No.: 14/357,846

(22) PCT Filed: Nov. 15, 2012

(86) PCT No.: PCT/AT2012/050176
§ 371 (c)(1),
(2) Date: May 13, 2014

(87) PCT Pub. No.: WO2013/071326
PCT Pub. Date: May 23, 2013

(65) Prior Publication Data
US 2015/0042006 A1    Feb. 12, 2015

(30) Foreign Application Priority Data

Nov. 17, 2011    (AT) .................................. A 1713/2011

(51) Int. Cl.
*B28B 3/12*    (2006.01)
*B28B 13/02*    (2006.01)
(Continued)

(52) U.S. Cl.
CPC .............. *B28B 3/123* (2013.01); *B28B 1/005* (2013.01); *B28B 13/02* (2013.01); *B28B 13/028* (2013.01);
(Continued)

(58) Field of Classification Search
CPC .. B65G 2201/042; B65G 31/04; B65G 47/80; B28B 13/02; B28B 13/028; B28B 1/005; B29C 2043/483; B29C 2043/486
(Continued)

(56) References Cited

U.S. PATENT DOCUMENTS 3,279,655 A * 10/1966 Isserlis ............... B65G 65/4818
222/168
3,966,124 A *  6/1976 Sukup ................... A01F 25/186
239/666

(Continued)

FOREIGN PATENT DOCUMENTS

BE        565 536 A    3/1958
CN       1099711 A    3/1995
(Continued)

OTHER PUBLICATIONS

BE 565 536 (Similpierre Export S.R.L.) Mar. 31, 1958 (English language translation). [translated May 9, 2018]. (Year: 1958).*
(Continued)

*Primary Examiner* — Erin Snelting
(74) *Attorney, Agent, or Firm* — Lerner, David, Littenberg, Krumholz & Mentlik, LLP (57) ABSTRACT

A device (1) for producing a slab (9) from artificial stone material by means of a double-belt press having a lower belt (2) and an upper belt (3), the double-belt press comprising a charging device (4) for loading a starting material for producing the slab (9) onto the lower belt (2), and the charging device (4) comprising at least one drum (5, 6) that is rotatable about its longitudinal axis (a1, a2).

13 Claims, 11 Drawing Sheets

(51) Int. Cl.
  *B28B 1/00* (2006.01)
  *B30B 5/06* (2006.01)
  *C04B 40/00* (2006.01)
  *B29C 43/00* (2006.01)
  *B29C 43/48* (2006.01)

(52) U.S. Cl.
  CPC ............ B30B 5/06 (2013.01); C04B 40/0071 (2013.01); *B29C 43/003* (2013.01); *B29C 43/48* (2013.01)

(58) Field of Classification Search
  USPC .................................................. 425/130, 371
  See application file for complete search history.

(56) References Cited

U.S. PATENT DOCUMENTS

| | | | |
|---|---|---|---|
| 4,300,725 A | 11/1981 | Moherek | |
| 4,725,005 A * | 2/1988 | Wiegelmann | A01C 17/008 198/642 |
| 4,874,130 A * | 10/1989 | Wondergem | A01C 15/04 239/63 |
| 5,145,627 A * | 9/1992 | Berion | B28B 5/027 264/113 |
| 5,238,035 A * | 8/1993 | Poussin | B01J 8/002 141/286 |
| 5,298,209 A * | 3/1994 | Pagani | B29O 43/228 264/105 |
| 5,950,694 A * | 9/1999 | Jama | B01J 8/002 141/285 |
| 6,382,947 B1 * | 5/2002 | Bryant | B01F 5/265 425/130 |
| 7,878,428 B2 * | 2/2011 | Pinon | B01J 8/002 239/684 |

FOREIGN PATENT DOCUMENTS

| | | |
|---|---|---|
| CN | 1453110 A | 11/2003 |
| CN | 201566167 U | 9/2010 |
| DE | 41 42 999 A1 | 7/1993 |
| GB | 1260469 A | 1/1972 |
| WO | 01/14113 A1 | 3/2001 |
| WO | 2010/115225 A1 | 10/2010 |

OTHER PUBLICATIONS

BE 565536 (Similpierre Export S.R.L.) Mar. 31, 1958 (English language human translation completed May 9, 2018). (Year: 1958).*

International Search Report of PCTAT2012/050176, dated Apr. 23, 2013.

* cited by examiner

DEVICE AND METHOD FOR PRODUCING A SLAB FROM ARTIFICIAL STONE MATERIAL

CROSS REFERENCE TO RELATED APPLICATIONS

This application is the National Stage of PCT/AT2012/050176 filed on Nov. 15, 2012, which claims priority under 35 U.S.C. § 119 of Austrian Application No. A 1713/2011 filed on Nov. 17, 2011, the disclosure of which is incorporated by reference. The international application under PCT article 21(2) was not published in English.

The invention relates to a device for producing a slab from artificial stone material comprising a double-belt press with a lower belt and an upper belt, the device comprising a charging device for supplying the double-belt press with material for the slab.

The invention also relates to a method for producing a slab from artificial stone material consisting of a mineral filler and a polymer binding agent.

The invention also relates to an artificial stone slab.

From WO 2010/115225 a method is known for the continual production of slabs from artificial stone material by using a double-belt press, in which a molding material is pressed which comprises a mixture of a mineral filler and a polymer binding agent. The binding agent is selected from polyester, polyurethane or epoxy resins, wherein the molding material comprises 85% to 95% filler and 5% to 15% binding agent. The filler can preferably be selected from stone material, marble powder, quartzite, quartz or a mixture thereof; with a particle size of 1 µm to 10 mm. In addition, pigments, coloring agents, mirror or glass fragments can be added. For the production of the slabs a double-belt press is used with a vibration device in the region of a pre-compaction zone in order to achieve a homogenous distribution of the molding material.

However, because of the vibration device the known device is very costly to produce. A further disadvantage of the known method or the known device is that because of the poor transportation properties of the molding material between the belts of the double-belt press the size of the slabs that can be produced is severely limited. Furthermore, the sizes of areas with the same color and the distribution of these areas on the slabs cannot be influenced effectively.

Therefore, the objective of the present invention is to simplify the production process and improve the quality of the product.

This objective is achieved according to the invention by a device of the aforementioned kind in that the charging device comprises at least one drum that is rotatable about its longitudinal axis.

The invention makes it possible to produce artificial stone slabs with areas that are sharply delineated from one another in terms of color, as by rotating the drum a granulating process can be performed by means of which from a mixture of the base materials which are filled into the drum, a granulate can be obtained with predefinable. Thus the granulate can comprise rounded particles, for example with a surface area of 1-40 cm².

According to an advantageous variant of the invention a distribution device for distributing a granulate exiting from the drum is provided at an outlet opening of the drum. By means of the distribution device a homogenous distribution of the granulate exiting from the drum can be achieved on the lower belt or a transport means in the direction of the lower belt.

In a preferred variant of the invention the distribution device is designed in the form of a rotary disc. The rotary disc is driven and rotates about an axis running normally to its surface. Hereby it hurls the granulate onto the lower belt or onto a conveyor belt connected upstream of the lower belt. In this way in a simple manner a homogenous distribution of the particles of the granulate can be ensured. This is particularly advantageous if a plurality of drums are used for producing the granulate, which each produce a granulate of a single color.

According to further embodiment of the invention a laterally partly peripheral screen is provided on the rotary disc, wherein the screen is open in the transport direction of the granulate in the direction of the double-belt press. In this way a controlled outlet of the granulate from the rotary disc to the lower belt of the belt press or onto the conveyor belt connected upstream of the lower belt can be ensured. By providing a screen an outlet direction for the granulate is defined and there is no loss caused by the outlet of colored granulate in undesirable directions. According to an advantageous variant the screen is fixed relative to the rotary disc.

According to an advantageous development the rotary disc can be coated by a layer of elastomer material, in particular rubber. In this way an essential improvement can be achieved when conveying the granulate from the rotary disc to the lower belt.

According to an advantageous development of the invention between the at least one drum and distribution device at least one feeding unit is provided. In this way a specific guiding of the granulate from the drum to the distribution device, for example the rotary disc, can be achieved.

According to a further embodiment the feeding unit can be designed to be funnel-like.

According to a further advantageous variant of the invention at least two drums are provided. This makes it possible to produce a granulate with one drum that has a different color from the granulate produced by a different drum.

The aforementioned problem can also be addressed by a method of the aforementioned kind in that a device is used according to one of claims 1 to 10, wherein in a first step a filling mixture of a starting material for producing the slab is filled into a drum and in a second step a granulate is produced from the filling mixture by rotating the drum in a granulation process. After the production of the granulate the latter can be distributed homogenously over the lower belt or over a conveyor belt connected upstream of the lower belt. By means of pre-compression rollers described below from the homogenously distributed granulate a plate-like preform is produced which is then supplied to the double-belt press. The method according to the invention enables the production of artificial stone slabs with areas that are sharply delineated from one another in terms of color.

The granulation process is carried out until the particles of the granulate produced by the drum have a predetermined sphericity.

According to a preferred embodiment of the invention the granulation process is performed until the particles have a Rittenhouse sphericity of 0.75-0.97, wherein the particles of the granulate can have a grain size with a diameter of 5 mm-30 mm.

In the first step the drum is preferably provided with a filling mixture which comprises at least 60% stone material, in particular stone powder, with a particle size of 1 µm to 10 mm.

The invention and further advantages are described in more detail in the following with reference to non-limiting exemplary embodiments, which are represented in the drawings.

In a schematically much simplified representation.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position. Furthermore, also individual features or combinations of features from the various exemplary embodiments shown and described can represent in themselves independent or inventive solutions.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

It should also be mentioned that the Figures are described in general.

Figure 1:
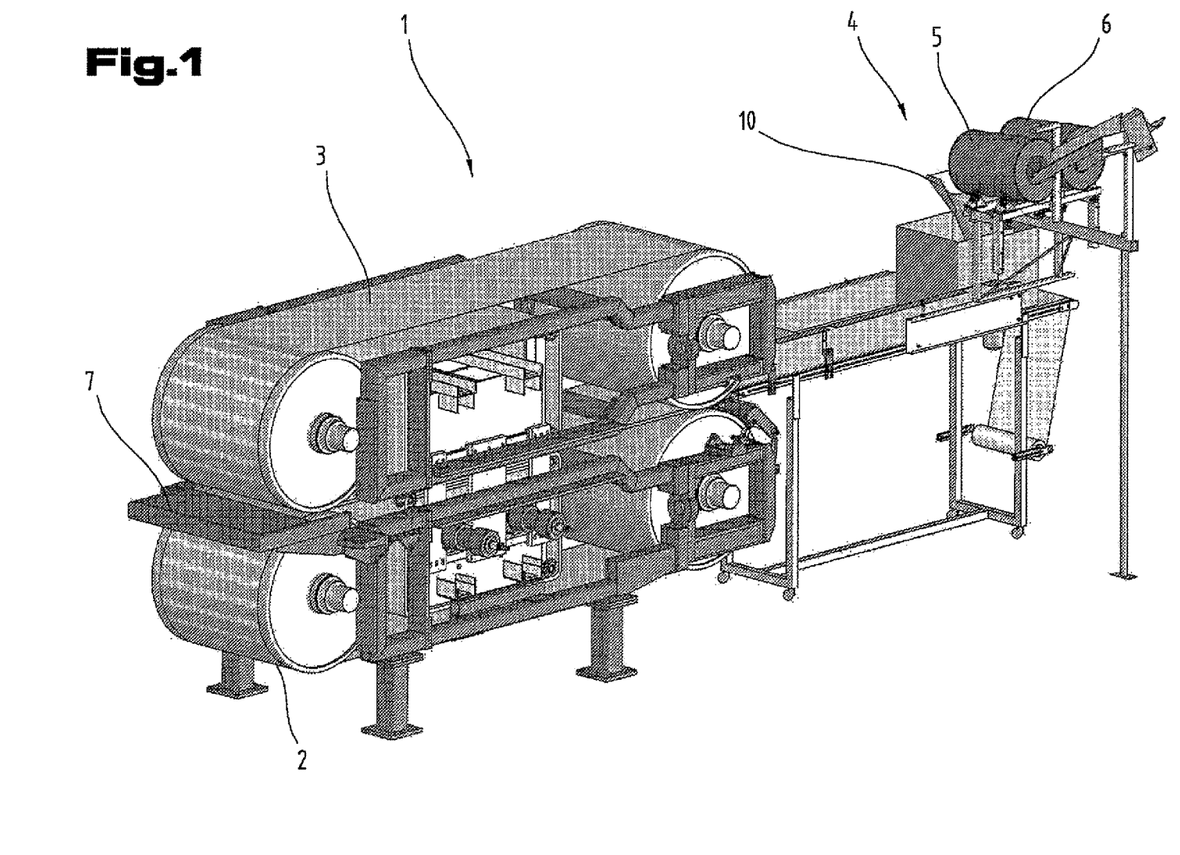
FIG. 1 shows a perspective view of a device according to the invention.
Figure 2:
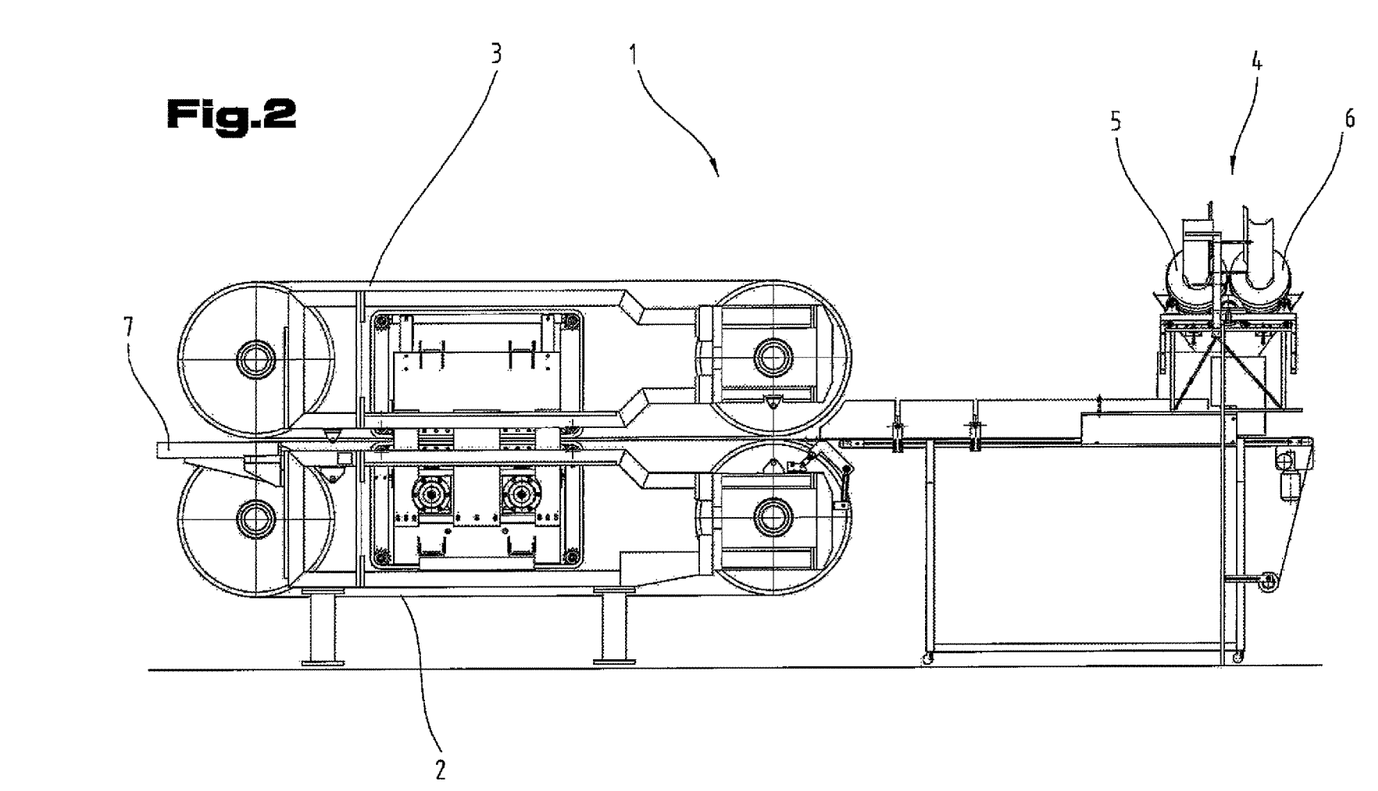
FIG. 2 shows a side view of the device of FIG. 1.

According to FIGS. 1 and 2 a device 1 according to the invention comprises a double-belt press with a lower belt 2 and an upper belt 3. The device 1 shown also comprises a charging device 4 which comprises two drums 5 and 6, as shown in FIGS. 1 to 10. The drums 5 and 6 are mounted rotatably about their longitudinal axes, which are denoted in FIGS. 6 and 7 by the reference numbers a1 and a2. The drums 5 and 6 can be designed to be similar, as shown.

Figure 6:
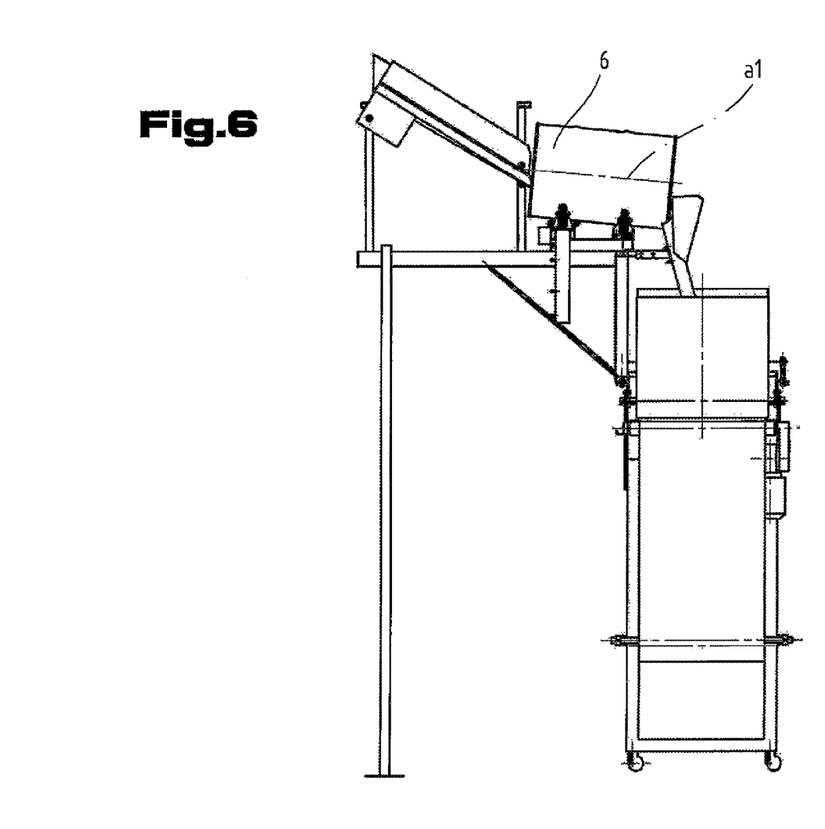
FIG. 6 shows a view of the charging device from direction 6 in FIG. 5.
Figure 7:
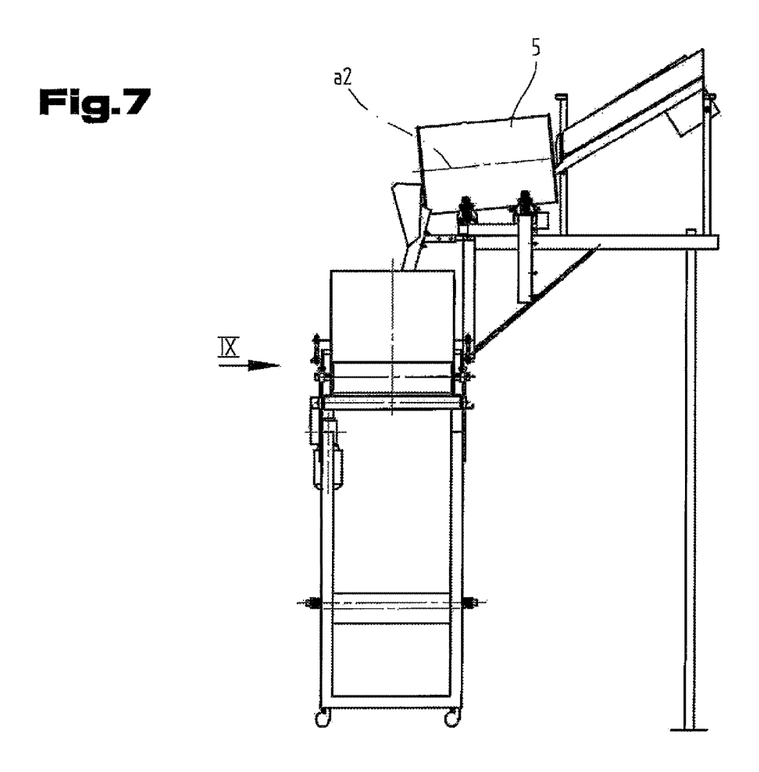
FIG. 7 shows a view of the charging device from direction 7 in FIG. 5.

A filling mixture is filled into each of the drums 5 and 6, to which colored particles have been added. The filling mixture can comprise for example at least 60% stone material, in particular stone powder, with a particle size of 1 μm to 10 mm. Furthermore, polymers are added to the filling mixture as binding agents. In particular, the filling mixture can be composed, as known from the aforementioned WO 2010/115225. Thus polyester, polyurethane or epoxy resins can be provided as the binding agents and the molding material can comprise 85% to 95% filler and 5% to 15% binding agent. The filler can preferably comprise a stone material, marble powder, quartzite, quartz or a mixture thereof and have a particle size of 1 μm to 10 mm.

The number of drums 5 and 6 can be varied according to the number of desired colors for the artificial stone slab 7 to be produced. According to a preferred variant of the invention a granulate of one color is produced by one drum 5 and 6, wherein the colors of the granulates produced by the drums 5 and 6 can differ from one another. Thus for example a white colored granulate can be produced by means of drum 5 and a black colored granulate can be produced by means of drum 6.

Figure 9:
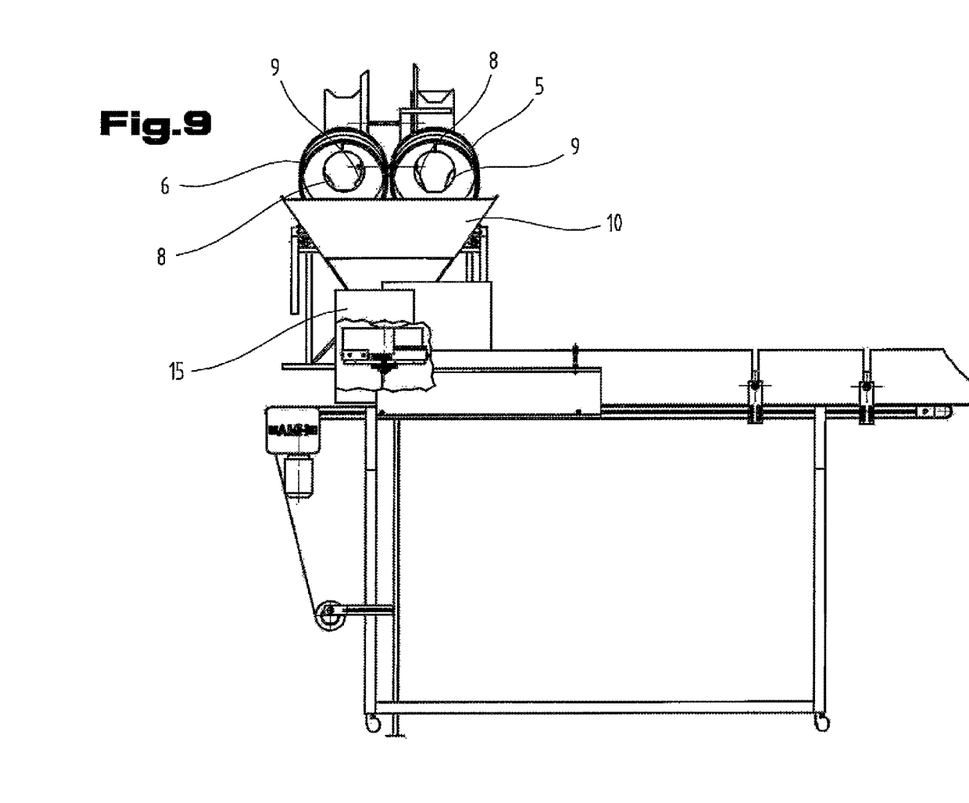
FIG. 9 shows a view of the charging device from direction 9 in FIG. 7.
Figure 10:
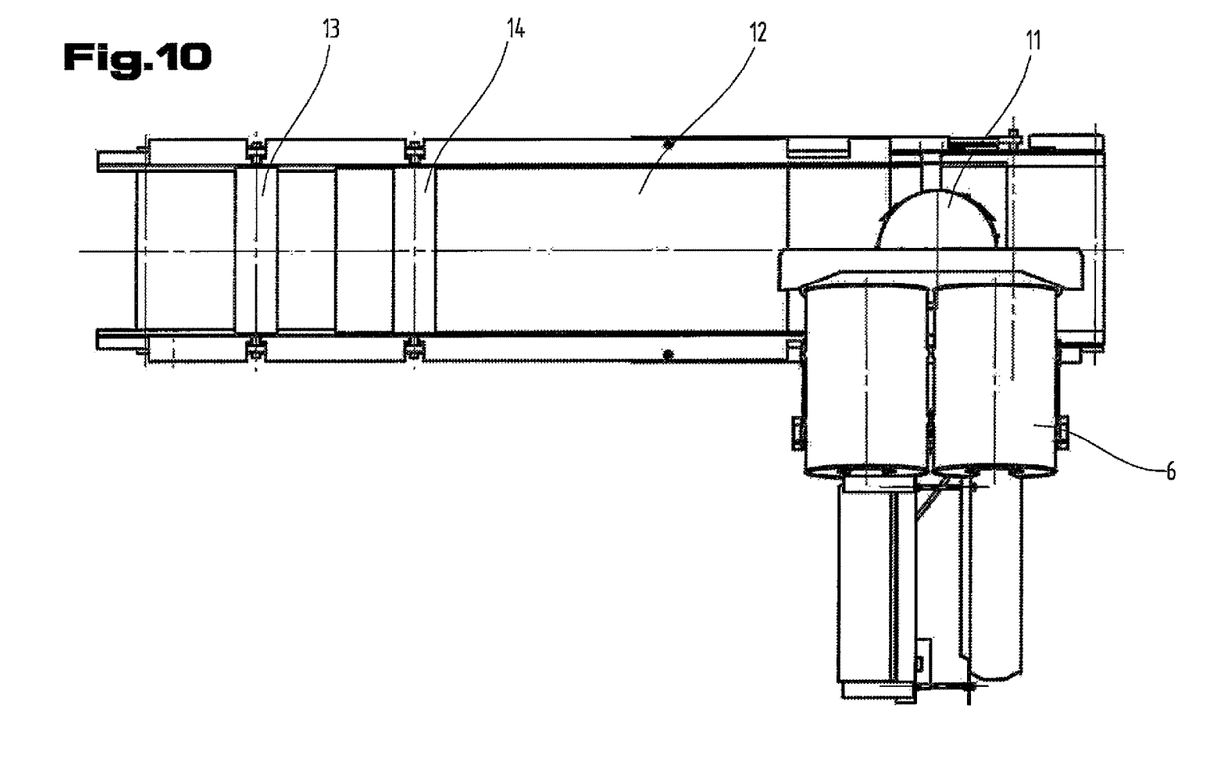
FIG. 10 shows a plan view of the charging device of FIG. 5.

The drums 5 and 6 can comprise drivers attached to the inside which are denoted in FIG. 9 by the reference numbers 8 and 9. The drivers 8, 9 can have the form of strips for example.

The filling material is filled into inlet openings of the drums 5 and 6 and into the drums 5 and 6 by rotating the drums 5 and 6 and granulated until a granulate is obtained from the filling material, the particle size of which has a predetermined sphericity and specific grain size.

Figure 3:
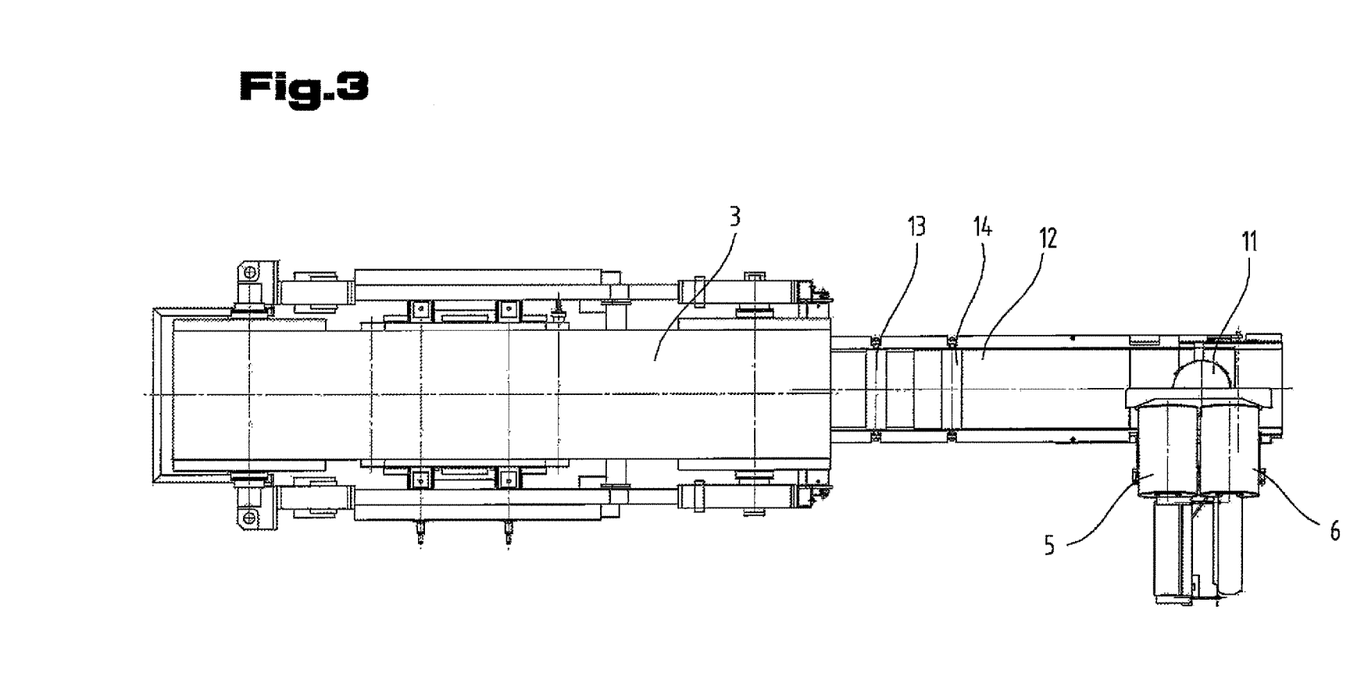
FIG. 3 shows a plan view of the device of FIG. 1.
Figure 11:
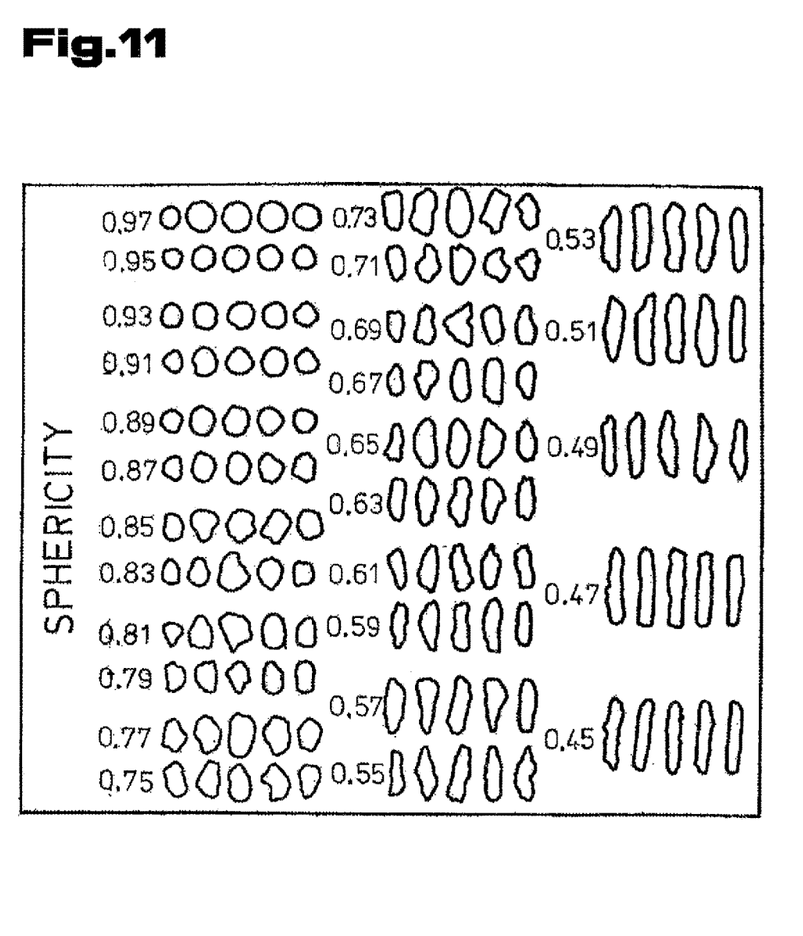
FIG. 11 shows the standard chart for determining the Rittenhouse sphericity.

The number of rotations of the drums 5 and 6 per unit of time or the supplied power determine in this case the desired properties of the resulting granulate. Preferably, the resulting granulate which leaves the respective drum 5, 6 has a Rittenhouse sphericity of 0.75-0.97 and a grain size of between 5 and 30 mm. FIG. 11 shows the standard chart for determining the Rittenhouse sphericity. From the grain size of the granulate also the size of the corresponding colored areas of the artificial stone slab 7 can be influenced in a simple manner. By means of an inclined arrangement of the drums 5, 6 the produced granulate, which has the aforementioned properties, can fall out of the corresponding drum 5 or 6. The color granulates 10 and 11 exiting the drums 5 and 6 are applied onto a distribution device 11 via a feeding unit 10, which has a receiving section and an output section. The feeding unit 10 can be configured in the form of a funnel or as a funnel for example. In the embodiment of the invention shown here the distribution device 11 charged by the feeding unit 10 is arranged below the outlet openings of the drums 5 and 6. The distribution device 11 can be configured for example as a driven rotary disc, as shown in FIG. 3.

By rotating the rotary disc 11 about an axis running normally to its surface, the particles of the granulate of different colors thrown out from the drums 5, 6 and hitting the rotary disc 11 are distributed homogenously over the width of the lower belt 2 or over the width of a conveyor belt 12 upstream of the lower belt 2. Instead of using the conveyor belt 12, which is arranged upstream of the double-belt press, the granulate could also be distributed directly onto the lower belt 2. In this case the conveyor belt 12 would be omitted and the lower belt 2, which would take on the function of the shown conveyor belt 12, would be longer than the upper belt 3 of the double-belt press.

The rotary disc 11 can be coated on the surface with an elastomer material, for example rubber, in order to distribute the granulate more effectively on the lower belt 2 or the conveyor belt 12.

Figure 4:
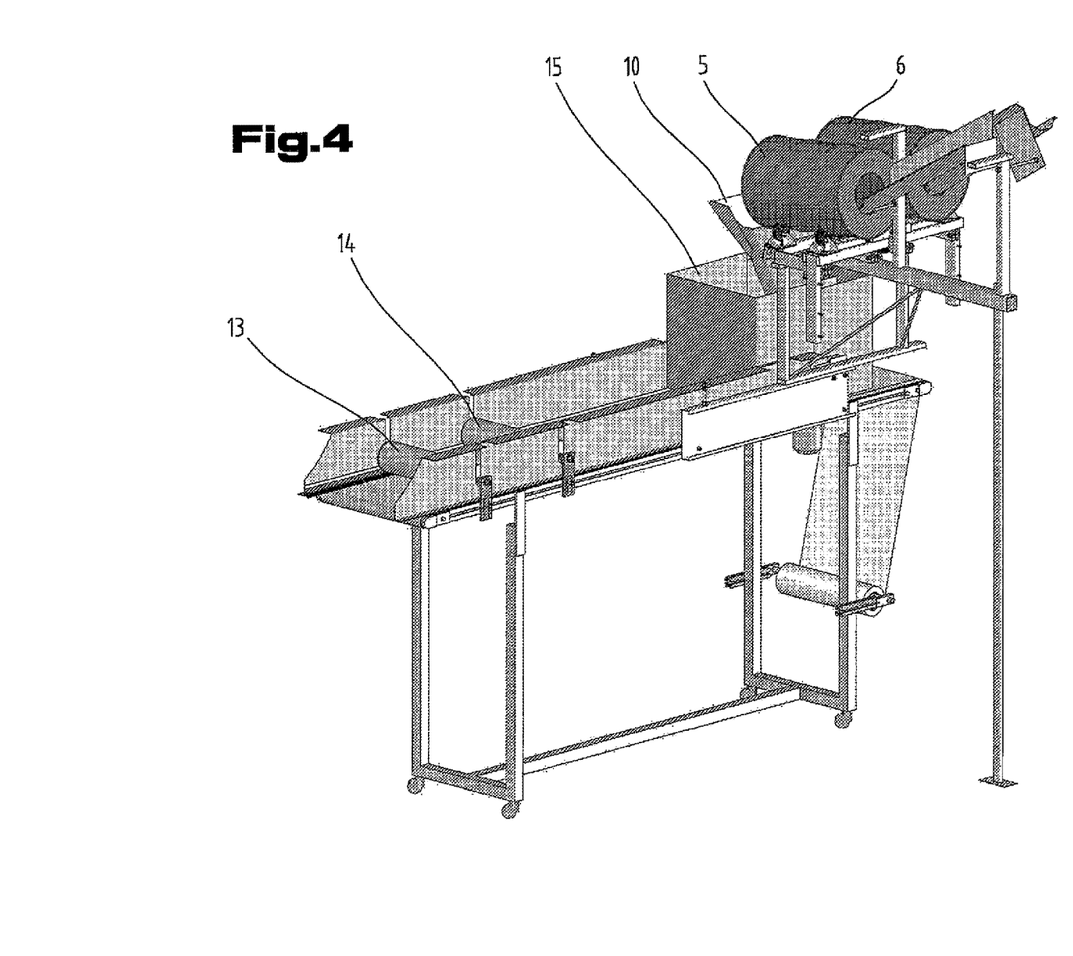
FIG. 4 shows a perspective view of a charging device of the device of FIG. 1.
Figure 5:
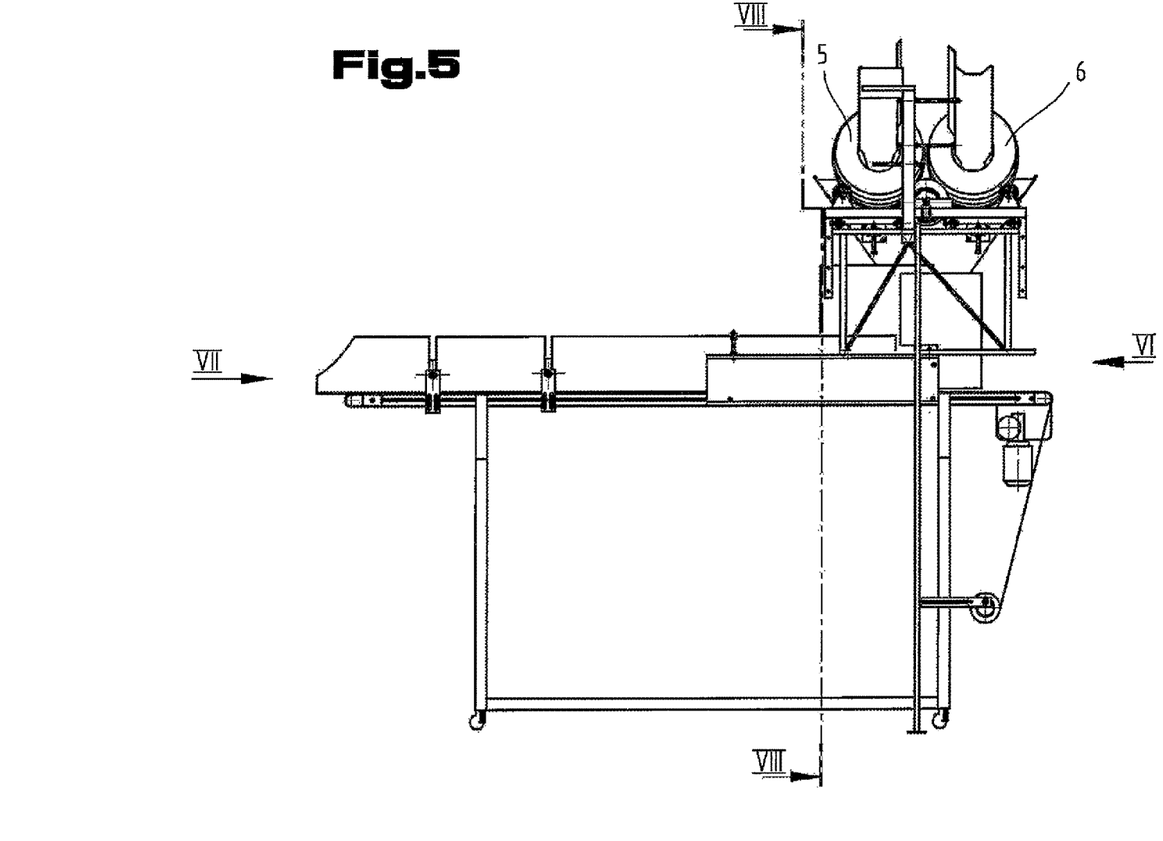
FIG. 5 shows a side view of the charging device of FIG. 4.
Figure 8:
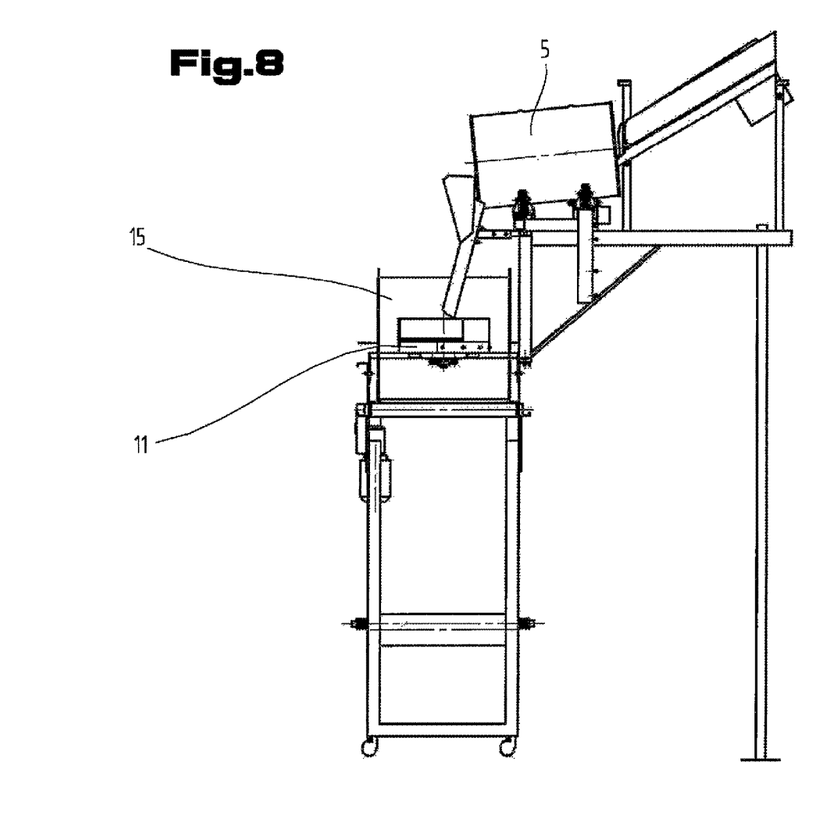
FIG. 8 shows a cross section along the line 8-8 in FIG. 5.

A shown in FIG. 4, the rotary disc 11 can be partly surrounded in circumferential direction by a screen 15. The screen 15 can be open in the transport direction of the lower belt 2 or the conveyor belt 12, as shown in FIG. 8.

The granulate distributed homogenously on the lower belt 2 or the conveyor belt 12 can be compressed by means of precompressor rollers 13 and 14 (FIG. 3, 4, 10) to form a slab-like preform with a defined height. Afterwards the preform is compressed in the double-belt press to form the slab 7, the double-belt press can comprise a heating element for hardening the slab 7.

The exemplary embodiments show possible embodiment variants of the device according to the invention or the method according to the invention, whereby it should be noted at this point that the invention is not restricted to the embodiment variants shown in particular. Rather various different combinations of the individual embodiment variants are also possible and this variability, due to the teaching on technical procedure, lies within the ability of a person skilled in the art in this technical field.

LIST OF REFERENCE NUMERALS 1 device
2 lower belt
3 upper belt
4 charging device
5 drum
6 drum
7 artificial stone slab
8 driver
9 driver
10 feeding unit
11 distribution device; rotary disc
12 conveyor belt
13 precompressor roller
14 precompressor roller
15 screen
a1 axis
a2 axis

The invention claimed is:

1. A device for producing a slab from an artificial stone material comprising a double-belt press with a lower belt and an upper belt, the device comprising a charging device for charging the double-belt press with a material for the slab,
   wherein the charging device comprises at least two drums that are rotatable about their longitudinal axis,
   wherein below an outlet opening of the drums a rotary disc with a larger diameter than its thickness and with a rotational, axis transverse to the longitudinal axis of the at least two drums is provided for distributing a granulate exiting from the drums,
   wherein at least one screen is provided that at least partly surrounds the rotary disc laterally, and
   wherein the screen is open in a transport direction of the granulate in the direction of the double-belt press.

2. The device as claimed in claim 1, wherein the screen is fixed relative to the rotary disc.

3. The device as claimed in claim 1, wherein the rotary disc is coated with a layer made from an elastomer material.

4. The device as claimed in claim 1, wherein between the at least two drums and the rotary disc at least one feeding unit is provided.

5. The device as claimed in claim 4, wherein the feeding unit is in the form of a funnel.

6. A method for producing a slab from artificial stone material consisting of a mineral filler and a polymer binding agent,
   wherein in a first step a first filling mixture comprising a first starting material for producing the slab of one color is filled into a first of several drums and a second filling mixture comprising a second starting material for producing the slab of another color is filled into a second of the several drums,
   wherein in a second step by rotating the drums a first granulate having a first color is produced from the first filling mixture in a first granulation process and a second granulate having a second color is produced from the second filling mixture in a second granulation process,
   wherein the first granulate and the second granulate are compressed in at least one further step to form the slab, and
   wherein the first color and the second color differ from one another.

7. The method as claimed in claim 6, wherein the first granulation process is performed until particles of the first granulate produced by the first drum have a predetermined first sphericity.

8. The method as claimed in claim 7, wherein the first granulation process is performed until the particles of the first granulate have a Rittenhouse sphericity of 0.75-0.97.

9. The method as claimed in claim 6, wherein the first granulation process is performed until particles of the first granulate have a grain size with a diameter of 5 mm-30 mm.

10. The method as claimed in claim 6, wherein the first filling mixture comprises at least 60% stone material by weight, with a particle size from 1 µm to 10 mm.

11. The method as claimed in claim 6, wherein the second granulation process is performed until particles of the second granulate produced by the second drum have a predetermined second sphericity.

12. The method as claimed in claim 11, wherein the second granulation process is performed until the particles of the second granulate have a Rittenhouse sphericity of 0.75-0.97.

13. The method as claimed in claim 6, wherein the second granulation process is performed until particles of the second granulate have a grain size with a diameter of 5 mm-30 mm.

* * * * *